(12) United States Patent
Ike et al.

(10) Patent No.: US 7,383,726 B2
(45) Date of Patent: Jun. 10, 2008

(54) PACKAGE STRUCTURE OF SENSOR AND FLOW SENSOR HAVING THE SAME

(75) Inventors: Shinichi Ike, Tokyo (JP); Nobuhiko Zushi, Tokyo (JP); Takeshi Nishi, Kanagawa (JP)

(73) Assignee: Yamatake Corporation (JP)

( * ) Notice: Subject to any disclaimer, the term of this patent is extended or adjusted under 35 U.S.C. 154(b) by 0 days.

(21) Appl. No.: 11/703,581

(22) Filed: Feb. 7, 2007

(65) Prior Publication Data
US 2007/0227260 A1    Oct. 4, 2007

(30) Foreign Application Priority Data
Feb. 7, 2006 (JP) .............. 2006-030312

(51) Int. Cl.
*G01F 1/68* (2006.01)
(52) U.S. Cl. ................................. 73/204.22
(58) Field of Classification Search ............ 73/204.22, 73/204.11, 204.25, 204.26
See application file for complete search history.

(56) References Cited

U.S. PATENT DOCUMENTS

| | | | | |
|---|---|---|---|---|
| 4,130,018 A | * | 12/1978 | Adams et al. ............ 73/290 V |
| 4,348,900 A | * | 9/1982 | Takahashi et al. ........ 73/504.06 |
| 5,789,673 A | * | 8/1998 | Igarashi et al. ............ 73/202.5 |
| 6,258,263 B1 | * | 7/2001 | Henderson et al. ....... 210/198.2 |
| 6,378,365 B1 | * | 4/2002 | Tu ........................ 73/204.26 |

FOREIGN PATENT DOCUMENTS

| JP | 5-99722 | 4/1993 |
|---|---|---|
| JP | 2000-146652 | 5/2000 |

* cited by examiner

*Primary Examiner*—Jewel Thompson
(74) *Attorney, Agent, or Firm*—Cantor Colburn LLP (57) ABSTRACT

The package structure may includes: a sensor chip having a detecting device formed on a front surface of a substrate; through electrodes that are arranged at predetermined positions of the substrate around the detecting device, electrically insulated at circumferences thereof, pierce the substrate from the front surface to a rear surface, are connected with lead patterns of the detecting device on the front surface side, and connected with signal fetching means for the outside on the rear surface side; a flow path body on which the sensor chip is mounted and which has a flow path (a conduction path) for a fluid being formed on a surface facing the detecting device and sealing means.

7 Claims, 5 Drawing Sheets

PACKAGE STRUCTURE OF SENSOR AND FLOW SENSOR HAVING THE SAME

CROSS REFERENCE TO RELATED APPLICATIONS

The present invention claims priority under 35 U.S.C. §119 to Japanese Application No. 2006-030312 filed Feb. 7, 2006, which is incorporated herein by reference.

BACKGROUND OF THE INVENTION

1. Field of the Invention

The present invention relates to a package structure of a sensor that measures a small flow rate, a pressure, a temperature, a concentration, a composition or the like of, e.g., a gas used in a semiconductor manufacturing apparatus, and to a flow sensor having the same.

2. Description of the Related Art

For example, as a flow rate measuring apparatus (a flow sensor) that detects a flow rate of a fluid, e.g., a gas used in a semiconductor manufacturing apparatus, there is a thermal type flow rate measuring apparatus that gives heat to a fluid and measures a temperature difference of the fluid at a predetermined position to measure a flow rate (see, e.g., Japanese Patent Application Laid-open No. H5(1993)-99722 (pp. 3-4, FIG. 1) and Japanese Patent Application Laid-open No. 2000-146652 (p. 2, FIG. 1)). Such a flow rate measuring apparatus is formed by bonding a sensor chip having a flow rate detecting device formed on a silicon substrate to a glass chip as a flow path chip that accommodates the flow rate detecting device and has a flow path (a groove) for a fluid flowing through the flow rate detecting device formed therein or to the silicon substrate.

Generally, in order to mount the flow rate measuring apparatus having the above-explained structure on a flowmeter or a flow rate controller, e.g., a mass flowmeter or a mass flow controller having a flow path body formed of a stainless member or the like, the flow rate measuring apparatus must be connected with the stainless member.

However, when a glass chip is bonded to a flow path body formed of a stainless member through, e.g., brazing, a difference in thermal expansion coefficient between both the members provokes distortion, thereby affecting sensor characteristics. Further, since a lead pattern must be pulled out to the outside of the flow path through a part of a bonded portion between the silicon substrate and the glass chip to take out an electrode, a countermeasure for maintaining strength or sealing properties of this portion is required. Furthermore, in a structure disclosed in Japanese Patent Application Laid-open No. 2000-146652 (p. 2, FIG. 1), since a part of a glass chip is constricted to take out an electrode, there is a problem of a reduction in strength of this constricted part.

SUMMARY OF THE INVENTION

The present invention may provide a package structure of a sensor in which a sensor chip that measures a small flow rate, a pressure, a temperature, a concentration, a composition or the like of, e.g., a gas used in a semiconductor manufacturing apparatus is directly mounted on a flow path (conduction path) body formed of a metal member or the like and which assures sealing properties, and a flow sensor having the same.

In order to solve the above-explained problem, according to the present invention, there is provided a package structure of a sensor, comprising: a sensor chip constituted of a substrate and a detecting device formed on a front surface of the substrate; a through electrode that is arranged at a predetermined position of the substrate around the detecting device, electrically insulated at a circumference thereof, pierces the substrate from the front surface to a rear surface, is connected with a lead pattern of the detecting device at an end thereof on the front surface side, and connected with signal fetching means for the outside at an end thereof on the rear surface side; a conduction path body which is formed of a metal member, on which the sensor chip is mounted, and which has a conduction path for a fluid extending to the detecting device being formed on a surface thereof facing the detecting device; sealing means that is interposed between the sensor chip and the conduction path body to assure sealing properties of the conduction path; and a pressing member that presses the sensor chip against the conduction path body from the rear surface side to be fixed, and has a region where the signal fetching means is led out from the end of the through electrode on the rear surface side being formed therein.

The sensor chip formed by connecting the lead pattern of the detecting device formed on the front surface of the substrate to the front-surface-side end of the through electrode formed on the substrate is mounted on the conduction path body formed of, e.g., a metal member through the sealing means, thereby sealing the conduction path formed to face the detecting device. Moreover, the pressing member is pressed against the rear surface of the sensor chip to fix the sensor chip to the conduction path body. When the sensor chip is pressed against the conduction path body, the sealing means collapses to be appressed against the sensor chip and the conduction path body, thereby assuring sealing properties of the conduction path. Additionally, a difference in thermal expansion coefficient between the sensor chip and the conduction path body is absorbed, and distortion due to the difference in thermal expansion coefficient is reduced to improve stability of the sensor.

One end of the signal fetching means for the outside is connected with the rear-surface-side end of the through electrode, and the other end of the same is led out from the external signal fetching region of a pressing plate. In this manner, the sensor chip is directly mounted on the conduction path body formed of the metal member. When the sensor chip is directly mounted on the conduction path body, a flow path chip is no longer necessary to simplify the structure.

Further, according to claim 2 of the present invention, there is provided a flow sensor comprising: a flow sensor chip constituted of a substrate and a flow rate detecting device formed on a front surface of the substrate; a through electrode that is arranged at a predetermined position of the substrate around the flow rate detecting device, electrically insulated at a circumference thereof, pierces the substrate from the front surface to a rear surface, is connected with a lead pattern of the flow rate detecting device at an end thereof on the front surface side, and connected with signal fetching means for the outside at an end thereof on the rear surface side; a flow path body on which the sensor chip is mounted, and which has a flow path for a fluid flowing through the flow rate detecting device being formed on a surface thereof facing the flow rate detecting device; sealing means that is interposed between the flow sensor chip and the flow path body to assure sealing properties of the flow path; and a pressing member that presses the flow sensor chip against the flow path body from the rear surface side to be fixed, and has a region where the signal fetching means is led out from the end of the through electrode on the rear surface side being formed therein.

The flow sensor chip formed by connecting the lead pattern of the flow rate detecting device formed on the front surface of the substrate with the front-surface-side end of the through electrode formed on the substrate is mounted on the flow path body formed of a metal member or the like through the sealing means, thereby sealing the flow path formed to face the detecting device. Furthermore, the pressing member is pressed against the rear surface of the flow sensor chip to fix the flow sensor chip to the flow path body. When the flow sensor chip is appressed against the flow path body, the sealing means collapses to be appressed against the flow sensor chip and the flow path body, thus assuring sealing properties of the flow path. Moreover, the sealing means absorbs a difference in thermal expansion coefficient between the sensor chip and the flow path body, and distortion due to the difference in thermal expansion coefficient is reduced to improve stability of the sensor.

One end of the signal fetching means for the outside is connected with the rear-surface-side end of the through electrode, and the other end of the same is led out from an external signal fetching region of a pressing member. In this manner, the flow sensor chip is directly mounted on the flow path body formed of the metal member or the like. Moreover, when the flow sensor chip is directly mounted on the flow path body, a flow path chip is no longer necessary to simplify the structure of the flow sensor.

Preferably in the flow sensor chip, the substrate is a silicon substrate and the flow rate detecting device is formed at a central position of a silicon nitride or silicon dioxide insulating film formed on an entire front surface of the silicon substrate and is covered with the silicon nitride or silicon dioxide insulating film, and a rear surface of the silicon substrate is covered with a silicon nitride or silicon dioxide insulating film, and a concave portion is formed on the front surface of the silicon substrate at a position corresponding to the flow rate detecting device, and a part of the insulating film that covers the concave portion functions as a diaphragm.

Preferably the flow rate detecting device is formed of a heater as a heating element made by platinum patterning, and two temperature measuring elements as resistance elements formed of platinum thin films on an upstream side and a downstream side of the heater at equal intervals, and lead patterns of these elements.

Preferably the through electrode is formed of a electrode column and an insulating member that insulates a circumference of the electrode column pierces the substrate from the front surface to the rear surface while maintaining an air-tight state, and a facet of the through electrode is level with the front surface and the rear surface of the substrate.

Preferably the flow path body has a concave portion that accommodates the flow sensor chip and is formed on an upper surface, and a concave groove that has a rim portion internally coming into contact with a side wall is formed on a bottom surface of this concave portion and the seal unit is a O ring and the concave groove is used to attach the O ring and a height of an inner rim portion thereof is set smaller than a thickness of the O ring and a width thereof is formed slightly larger than the thickness of the O ring.

Preferably a hole as an external signal fetching region is formed at the center of the pressing plate, and the hole has a size allowing an inner peripheral surface to be positioned outside the through electrodes formed on both sides of the flow rate detecting device of the flow sensor chip.

According to the present invention, when the sensor chip is directly mounted on the flow path (conduction path) body for measurement, the flow path chip formed of, e.g., glass or silicon can be eliminated. The number of components can be reduced, and bonding with respect to the flow path chip is no longer necessary, thereby decreasing a cost.

Additionally, when the sealing means is adopted as a connection component between the sensor chip and the flow path body, sufficient air-tight properties can be assured, a difference in thermal expansion coefficient between the silicon substrate and the flow path body formed of the metal member, e.g., a stainless member can be absorbed. As a result, characteristics of the sensor can be stabilized, thus improving a measurement accuracy.

Further, a signal of the sensor can be fetched from the rear surface of the sensor chip, the structure of the package becomes simple, a cost can be reduced, and assembling properties can be improved. Furthermore, changing a height, a width, and a shape of the flow path formed in the flow path body enables easy adjustment of a flow rate measurement range in accordance with specifications. Moreover, the sensor chip can be attached to/detached from the flow path body, thereby facilitating replacement or maintenance of the sensor chip.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1:
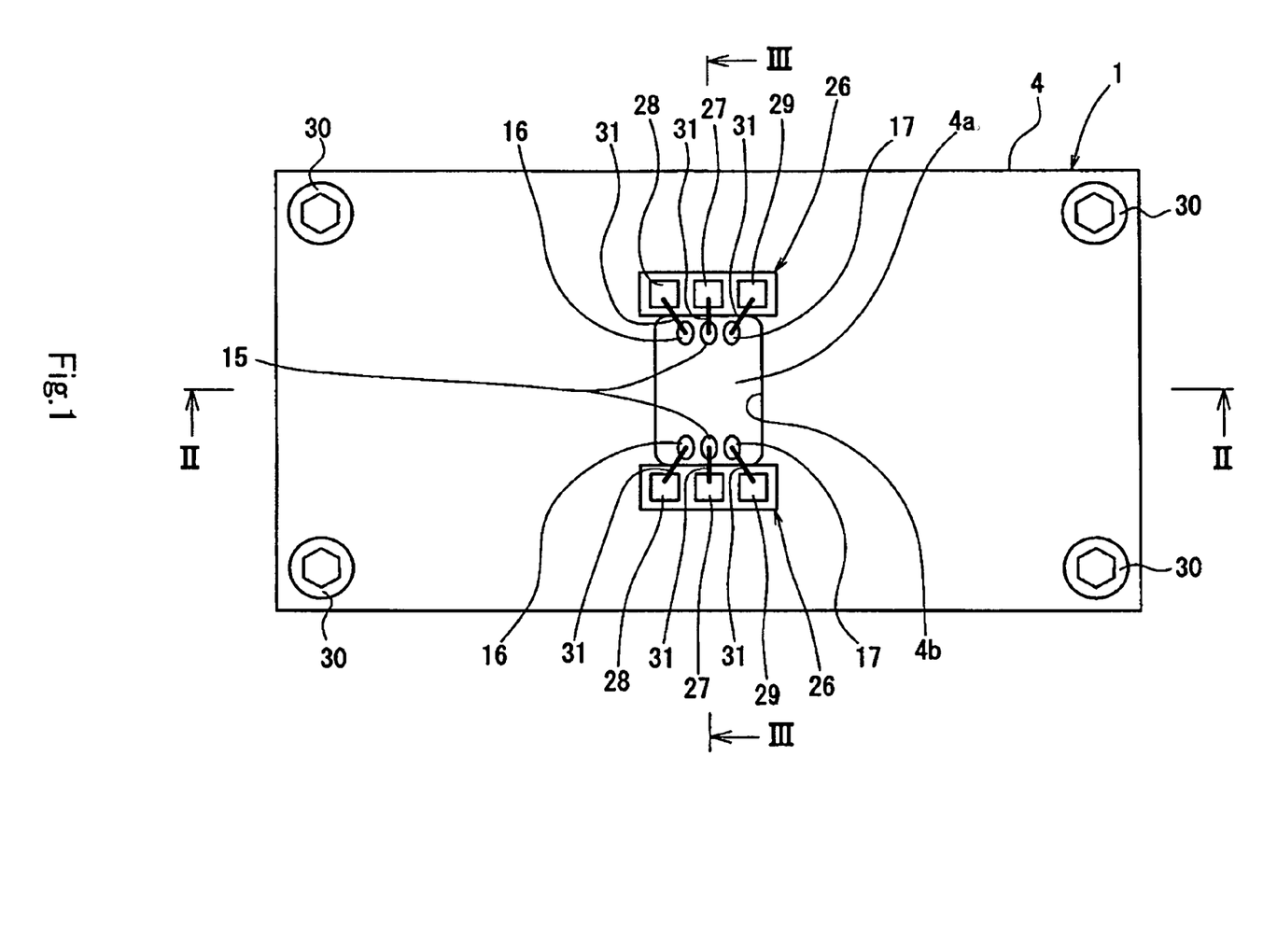
FIG. 1 is a plan view of a flow sensor to which a package structure of a sensor according to an embodiment of the present invention is applied.
Figure 2:
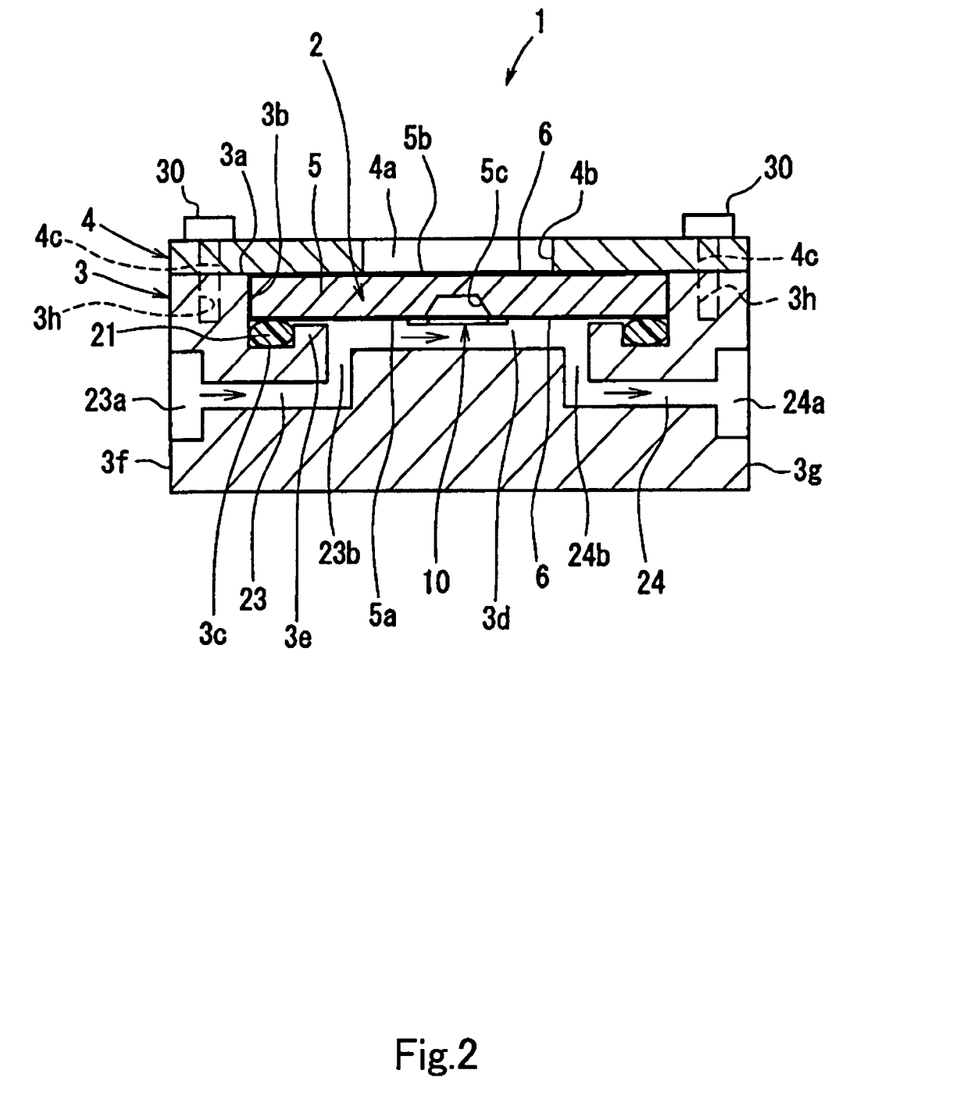
FIG. 2 is a cross-sectional view of the flow sensor taken along an arrow line II-II depicted in FIG. 1.
Figure 3:
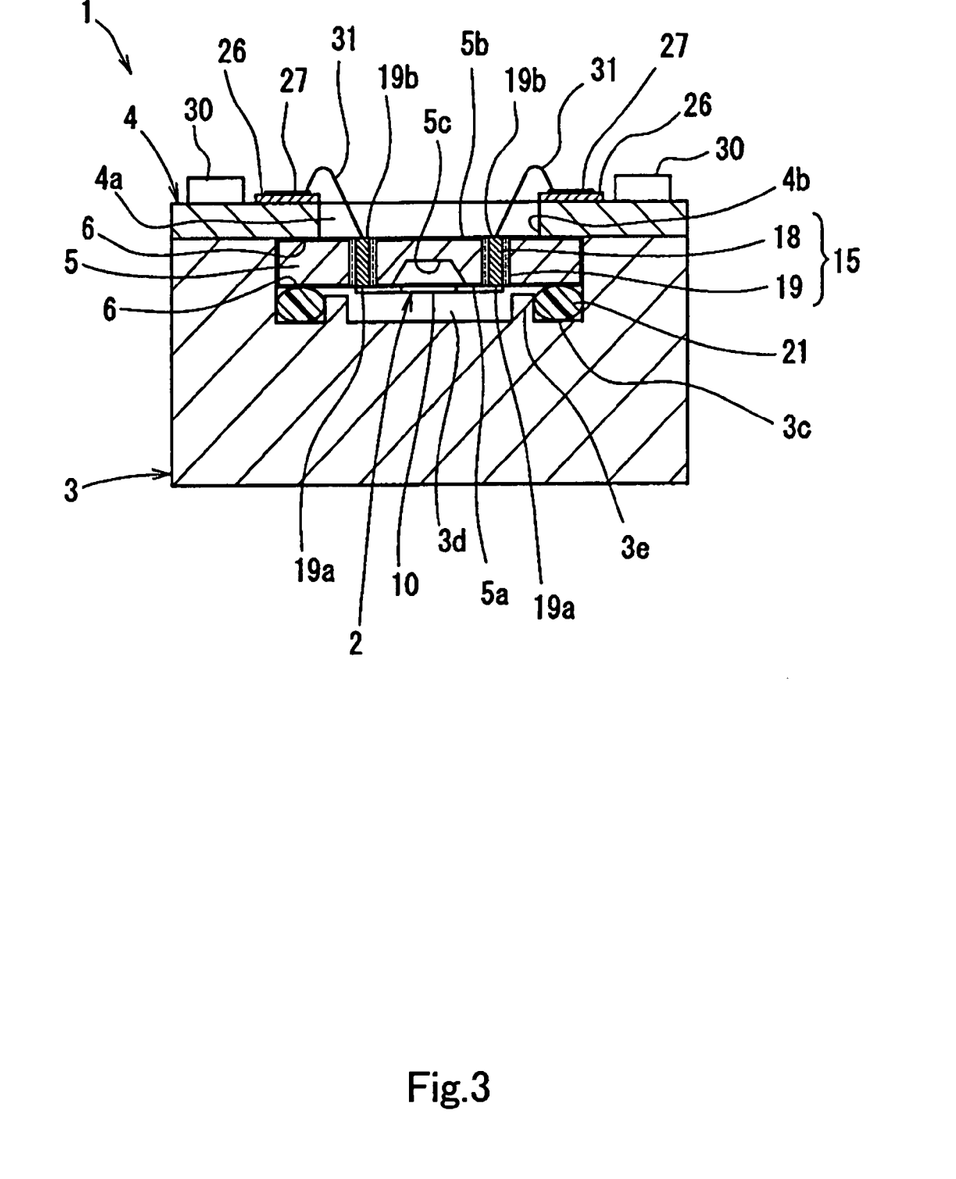
FIG. 3 is a cross-sectional view of the flow sensor taken along an arrow line III-III depicted in FIG. 1.

A package structure of a sensor according to an embodiment of the present invention will now be explained hereinafter with reference to the accompanying drawings. FIG. 1 is a plan view of a flow sensor to which a package structure of a sensor according to the present invention is applied, FIG. 2 is a cross-sectional view of the flow sensor taken along an arrow line II-II depicted in FIG. 1, and FIG. 3 is a cross-sectional view of the flow sensor taken along an arrow line III-III depicted in FIG. 1. As shown in FIGS. 1 to 3, a flow sensor 1 includes a flow sensor chip 2, a flow path body 3 that accommodates this flow sensor chip 2, and a pressing plate 4. For example, the flow sensor 1 is connected with a flowmeter or a flow rate controller, e.g., a mass flowmeter or a mass flow controller of a semiconductor manufacturing apparatus.

As shown in FIG. 2, in the flow sensor chip 2, a flow rate detecting device 10 is formed at a central position of a silicon nitride or silicon dioxide insulating film (thin film) 6 formed on an entire front surface 5a of a silicon substrate 5 having, e.g., a rectangular shape, and the flow rate detecting device 10 is covered with the silicon nitride or silicon dioxide insulating film (thin film) 6. Further, a rear surface 5b of the silicon substrate 5 is also covered with the silicon nitride or silicon dioxide insulating film (thin film) 6.

As shown in FIGS. 2 and 3, a concave portion 5c is formed on the front surface 5a of the silicon substrate 5 at a position corresponding to the flow rate detecting device 10, and a part of the insulating film 6 that covers the concave portion 5c functions as a diaphragm. As a result, the flow rate detecting device 10 and the silicon substrate 5 are thermally insulated from each other. Although not depicted in detail, the concave portion 5c is made by forming many slits at positions on the insulating films based on photolithography and etching and performing anisotropic etching with respect to the silicon substrate 5 through these slits.

Figure 5:
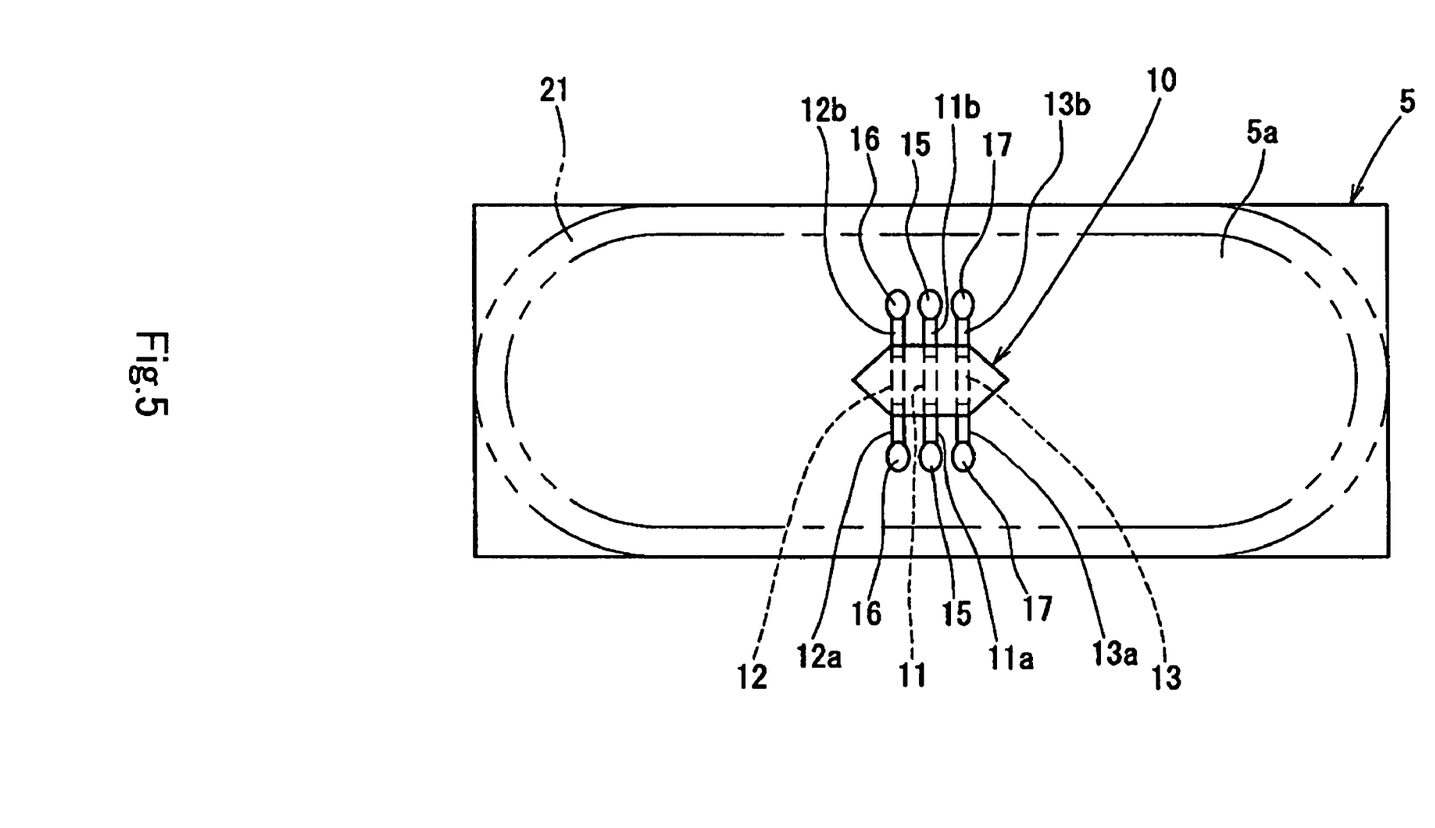
FIG. 5 is a plan view of a flow sensor chip depicted in FIG. 2.

As shown in FIG. 5, the flow rate detecting device 10 is formed of a heater 11 as a heating element made by patterning, e.g., platinum, two temperature measuring elements 12 and 13 as resistance elements formed of, e.g., platinum thin films on an upstream side and a downstream side of the heater 11 at equal intervals, and lead patterns 11a, 11b, 12a, 12b, 13a, and 13b of these elements.

In the silicon substrate 5 are formed through electrodes 15, 16, and 17 to which distal ends of the lead patterns 11a, 11b, 12a, 12b, 13a, and 13b are connected at predetermined positions around the flow rate detecting device, e.g., on both sides of the flow rate detecting device 10. As shown in FIG. 3, the through electrode 15 is formed of a electrode column 18 and an insulating member, e.g., glass 19 that insulates a circumference of this electrode column 18, pierces the silicon substrate 5 from the front surface 5a to the rear surface 5b while maintaining an air-tight state. Facets 19a and 19b are level with the front surface 5a and the rear surface 5b of the silicon substrate 5.

The through electrode 15 is formed by a known technology of forming, e.g., a silicon electrode. For example, the through electrode 15 is formed by forming an insulating film, e.g., a silicon oxide film obtained by thermal oxidation, a silicon oxide film or a silicon nitride film obtained by CVD on an inner wall surface of a hole formed in the silicon substrate 5, and filling a metal in this hole to provide a metal electrode, or filling glass that becomes an insulating layer in a ring-like hole formed in the silicon substrate 5 and adding an impurity to columnar silicon provided inside to form an electric conductor. It is to be noted that the impurity is, e.g., B (boron), In (indium), or Sb (antimony) when the silicon substrate 5 is formed of P-type silicon, or P (phosphorus) or As (arsenic) when the silicon substrate 5 is of an N-type silicon. The other through electrodes 16 and 17 are also formed like the through electrode 15.

Further, as shown in FIGS. 3 and 5, the distal ends of the lead patterns 11a and 11b of the flow rate detecting device 10 are electrically connected with the facet 19a of the through electrode 15 on the front surface side. The distal ends of the other lead patterns 12a, 12b, 13a, and 13b are likewise electrically connected with the facets of the through electrodes 16 and 17 on the front surface side.

Figure 4:
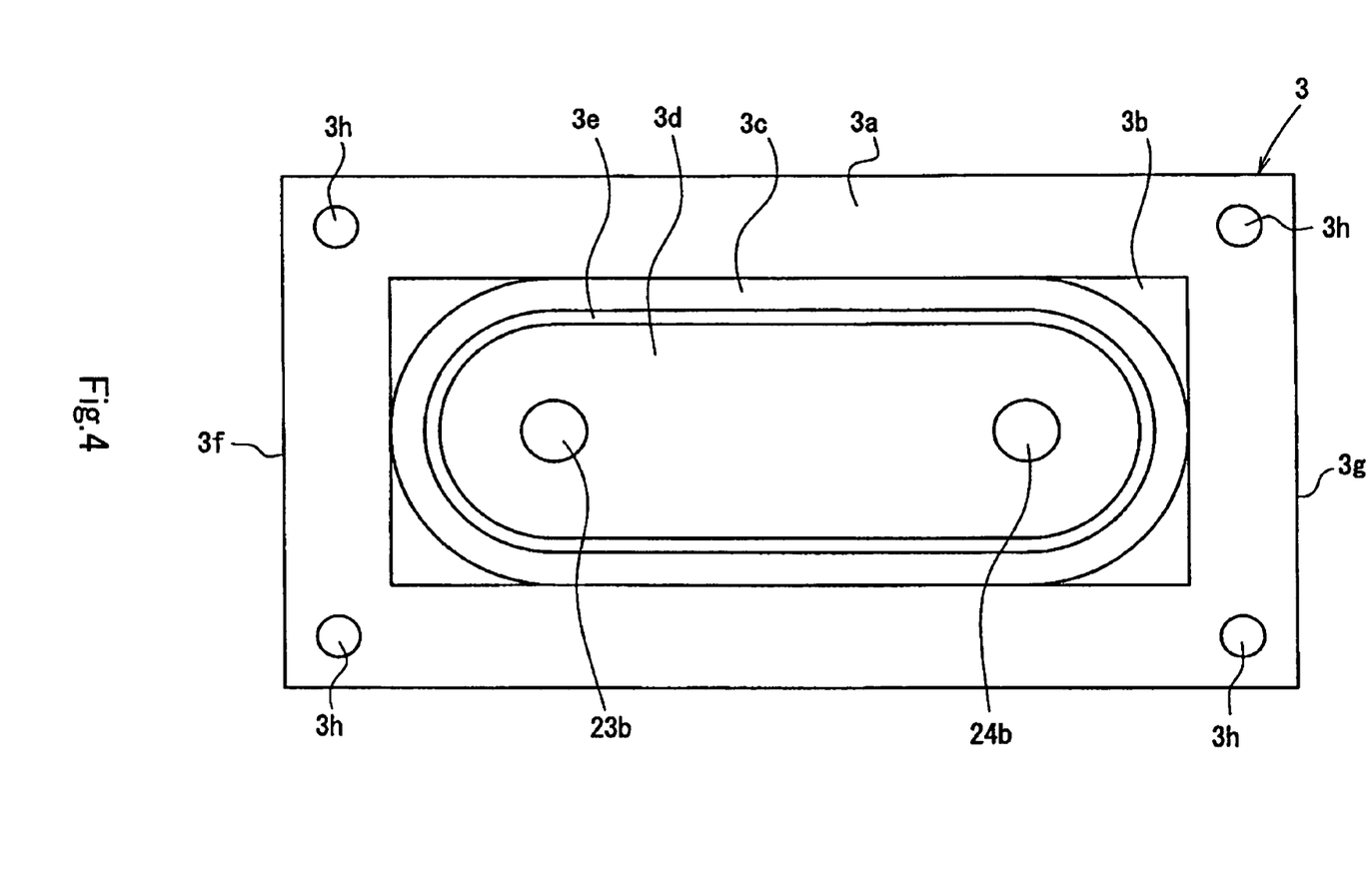
FIG. 4 is a plan view of a flow path body depicted in FIG. 2.

As shown in FIGS. 2 to 4, the flow path body 3 has a rectangular parallelepiped shape, and a concave portion 3b (see FIG. 4) that accommodates a flow sensor chip 2 and has a rectangular shape as seen in a plane is formed on an upper surface 3a. A concave groove 3c that has a rim portion internally coming into contact with a side wall and has an elliptic shape (an oval shape) as seen in a plane is formed on a bottom surface of this concave portion 3b, and a concave portion 3d that concentrically has an elliptic shape (an overall shape) as seen in a plane is formed in the concave groove 3c.

The concave groove 3c is used to attach an O ring having an elliptic shape (which will be referred to as "an elliptic O ring" hereinafter) as a later-explained connection member and sealing means, and a height of an inner rim portion 3e thereof is set smaller than a thickness of the elliptic O ring 21. Furthermore, a width thereof is formed slightly larger than the thickness of the elliptic O ring 21 so that the elliptic O ring 21 does not protrude from the concave groove 3c even if the elliptic O ring 21 collapses. Moreover, the concave portion 3d is determined as a flow path (which will be referred to as "a flow path 3d" hereinafter) for a fluid flowing on the flow rate detecting device 10.

As shown in FIGS. 2 and 4, a fluid lead-in flow path 23 and a fluid lead-out flow path 24 through which a fluid is led into the flow path 23 or out of the flow path 23 are formed in the flow path body 3 (see FIG. 2). Respective opening ends 23a and 24a of these flow paths 23 and 24 on one side are opened on both side surfaces 3f and 3g of the flow path body 3 on a narrow side, and respective opening ends 23b and 24b of the same on the other side are formed on a bottom surface of the flow path 3d near both side portions on a long-axis side.

Diameters of the opening ends 23a and 24a of the flow paths 23 and 24 are concentrically increased. For example, screws are formed on inner peripheral surfaces of these opening ends 23a and 24a, and a non-illustrated duct as a fluid passage can be connected with the opening ends 23a and 24a. Additionally, as shown in FIG. 4, screw holes 3h are formed at four corners of the upper surface 3a of the flow path body 3. This flow path body 3 is formed of, e.g., a stainless member.

Again referring to FIG. 1, a hole 4a as an external signal fetching region is formed at the center of the pressing plate 4. As shown in FIGS. 1 and 3, this hole 4a has a size allowing an inner peripheral surface 4b to be positioned outside the through electrodes 15, 16, and 17 formed on both sides of the flow rate detecting device 10 of the flow sensor chip 2, and hence the inner peripheral surface 4b does not come into contact with the facets of these through electrodes 15, 16, and 17 on the rear surface side.

Further, bolt insertion holes 4c are formed at four corners of the pressing plate 4 at positions corresponding to the screw holes 3h formed in the upper surface 3a of the flow path body 3 as shown in FIG. 2. This pressing plate 4 is formed of a metal member, e.g., a stainless member like the flow path body 3.

Printed boards 26 and 26 are fixed at both edges of the hole 4a of the pressing plate 4 facing the through electrodes 15, 16, and 17 via, e.g., an adhesive (see FIG. 3). Electrodes 27, 28, and 29 are formed on an upper surface of this printed board 26 in accordance with the facets of the through electrodes 15, 16, and 17 on the rear surface side.

A procedure of assembling the flow sensor unit 1 having the above-described structure will now be explained. As shown in FIGS. 2 and 3, the elliptic O ring 21 as the connection member and the sealing means are attached in the elliptic concave groove 3c of the flow path body 3. Furthermore, the flow sensor chip 2 is inserted into the concave portion 3b of the flow path body 3, and mounted on the elliptic O ring 21.

Subsequently, the pressing plate 4 is mounted on the rear surface of the flow sensor chip 2. Bolts 30 are inserted into the bolt insertion holes 4c, and screwed into the screw holes 3h of the flow path body 3 to be thereby fastened and fixed. The elliptic O ring 21 collapses to be appressed against the front surface of the flow sensor chip 2, i.e., the front surface 5a of the silicon substrate 5 with fastening of the bolts 30.

As a result, the flow path 3d is sealed with sufficient air-tight properties. In this manner, the flow sensor chip 2 is mounted and fixed on the flow path body 3.

In this state, as shown in FIGS. 2 and 3, a small gap is formed between the front surface 5a of the silicon substrate 5 and the upper facet of the inner rim portion 3e of the flow path body 3, thereby preventing the silicon substrate 5 from being pressed against the upper facet of the inner rim portion 3e, i.e., the flow path body 3.

The through electrodes 15, 16, and 17 are separated from the inside of the hole 4a, and the respective facets on the rear surface side are separated from the inner peripheral surface 4b of the hole 4a (see FIG. 3 showing the through electrode 15 alone). As a result, the through electrodes 15, 16, and 17 are completely electrically insulated from the pressing plate 4.

Then, the facets of the through electrodes 15, 16, and 17 on the rear surface side are respectively connected with the corresponding electrodes 27, 28, and 29 of the printed board 26 through the hole 4a of the pressing plate 4 by using wire bonding 31 as signal fetching means for the outside. In this manner, the flow sensor chip 2 is directly mounted on the flow path body 3 (see FIG. 3). Furthermore, the respective electrodes 27, 28, and 29 of the printed board 26 are connected with a non-illustrated signal fetching line to be further connected with a non-illustrated control circuit. Moreover, respective ends 23a and 24a of the flow paths 23 and 24 of the flow path body 3 on one side are connected with a non-illustrated flow path for a fluid.

When the elliptic O ring 21 is adopted for the connection component between the flow sensor chip 2 and the flow path body 3, sufficient air-tight properties of the flow path 3d can be assured, and a difference in thermal expansion coefficient between the silicon substrate 5 and the flow path body 3 formed of a stainless member can be absorbed. As a result, distortion due to a difference in thermal expansion coefficient of the flow sensor chip 2 can be avoided, thereby improving a measurement accuracy with stable sensor characteristics.

Additionally, changing the height of the flow path 3d formed in the flow path body (a cross-sectional area in a direction perpendicular to a direction along which a fluid flows) allows easy adjustment of a flow rate measurement range in accordance with specifications. Further, the flow sensor chip 2 can be attached to/detached from the flow path body 3, and replacement or maintenance of the flow sensor chip 2 is easy.

A function of the flow sensor 2 will now be explained. As shown in FIG. 2, a fluid, e.g., a gas is led into the flow path 3d from the fluid lead-in flow path 23 of the flow path body 3, and led out from the fluid lead-out flow path 24. The gas is flowed through the flow rate detecting device 10 as indicated by arrows to energize the heater 11. The heater 11 is heated to a temperature that is higher than a fluid temperature measured by a non-illustrated ambient temperature sensor provided to the silicon substrate 5 by a given fixed value, and heats the gas flowing through the flow rate detecting device 10 and the flow path 3d.

When there is no flow of the gas, a uniform temperature distribution is formed on an upstream side/a down stream side of the heater 11, and the temperature measuring element 12 on the upstream side and the temperature measuring element 13 on the downstream side demonstrate resistance values corresponding to substantially equal temperatures. On the other hand, when there is a flow of the gas, the uniform temperature distribution on the upstream side/the downstream side of the heater 11 collapses, and a temperature on the upstream side becomes low, whilst a temperature on the downstream side becomes high.

Further, although not explained in detail here, a Wheatstone bridge circuit constituted of the temperature measuring element 12 on the upstream side and the temperature measuring element 13 on the downstream side detects a difference in resistance value, i.e., a difference in temperature between the temperature measuring element 12 on the upstream side and the temperature measuring element 13 on the downstream side to measure a flow rate of the gas flowing through the flow path 3d.

It is to be noted that silicon is used for the substrate of the flow sensor chip 2 in the foregoing embodiment, but the present invention is not restricted thereto, and ceramics, sapphire, or a metal may be used. Furthermore, the flow path body 3 or the pressing plate 4 may not be formed of the metal member, but it may be formed of ceramics or a resin.

A hole does not have to be necessarily formed in the pressing plate 4. The pressing plate 4 may include electrode fetching means obtained by, e.g., sealing a circumference of, e.g., a pin piercing in a board thickness direction by using hermetic sealing glass. The electrode may be directly electrically connected with the facets of the through electrodes 15, 16, and 17 on the rear surface side by using a solder or an electroconductive resin. Moreover, as the connection member and the sealing means, a sheet-like gasket having a hole slightly larger than a shape of the flow path 3d may be used in place of the elliptic O ring 21.

Additionally, the flow rate detecting device 10 may have a diaphragm structure in which the insulating film 6 covers the concave portion 5c of the silicon substrate 5 like the foregoing embodiment, or may have a bridge structure in which the insulating film 6 covers at least a part of the concave portion 5c of the silicon substrate 5.

Further, although the above has explained the package structure in which the flow sensor chip 2 is accommodated in the flow path body 3 in conjunction with the foregoing embodiment, the present invention is not restricted thereto. It is needless to say that the present invention can be also applied to an example where a pressure sensor chip having a pressure detecting device formed therein is accommodated in the same flow body in place of the flow sensor to provide the package structure. It is to be noted that a flow path in the example of the pressure detecting device serves as a transmission path (a conduction path) through which a pressure of a fluid is transmitted to the pressure detecting device, and forming one flow path 23 can suffice. Likewise, the present invention can be also used for a sensor in which a detecting device that detects a temperature, a concentration, or a composition of a fluid is formed.

It is to be noted that the description has been given as to the example where one heater (the heating element) and the two temperature measuring elements arranged on both sides of this heater constitute an indirectly-heated flow rate detecting device in the foregoing embodiment, but the present invention is not restricted thereto. One heating element that also functions as the temperature measuring element, i.e., one heater may constitute a self-heating flow rate detecting device. Alternatively, two heating elements that also function as temperature measuring elements, i.e., two heaters may constitute a self-heating flow rate detecting device.

What is claimed is:

1. A package structure of a sensor, comprising:
   a sensor chip constituted of a substrate and a detecting device formed on a front surface of the substrate;
   a through electrode that is arranged at a predetermined position of the substrate around the detecting device, electrically insulated at a circumference thereof, pierces the substrate from the front surface to a rear surface, is connected with a lead pattern of the detecting device at an end thereof on the front surface side, and connected with signal fetching means for the outside at an end thereof on the rear surface side;

a conduction path body on which the sensor chip is mounted, and which has a conduction path for a fluid extending to the detecting device being formed on a surface thereof facing the detecting device;

sealing means that is interposed between the sensor chip and the conduction path body to assure sealing properties of the conduction path; and a pressing member that presses the sensor chip against the conduction path body from the rear surface side to be fixed, and has a region where the signal fetching means is led out from the end of the through electrode on the rear surface side being formed therein.

2. A flow sensor having a package structure of a sensor, comprising:

a flow sensor chip constituted of a substrate and a flow rate detecting device formed on a front surface of the substrate;

a through electrode that is arranged at a predetermined position of the substrate around the flow rate detecting device, electrically insulated at a circumference thereof, pierces the substrate from the front surface to a rear surface, is connected with a lead pattern of the flow rate detecting device at an end thereof on the front surface side, and connected with signal fetching means for the outside at an end thereof on the rear surface side;

a flow path body on which the sensor chip is mounted, and which has a flow path for a fluid flowing through the flow rate detecting device being formed on a surface thereof facing the flow rate detecting device;

sealing means that is interposed between the flow sensor chip and the flow path body to assure sealing properties of the flow path; and a pressing member that presses the flow sensor chip against the flow path body from the rear surface side to be fixed, and has a region where the signal fetching means is led out from the end of the through electrode on the rear surface side being formed therein.

3. The flow sensor according to claim 2, wherein in the flow sensor chip, the substrate is a silicon substrate and the flow rate detecting device is formed at a central position of a silicon nitride or silicon dioxide insulating film formed on an entire front surface of the silicon substrate and is covered with the silicon nitride or silicon dioxide insulating film, and a rear surface of the silicon substrate is covered with a silicon nitride or silicon dioxide insulating film, and a concave portion is formed on the front surface of the silicon substrate at a position corresponding to the flow rate detecting device, and a part of the insulating film that covers the concave portion functions as a diaphragm.

4. The flow sensor according to claim 3, wherein the flow rate detecting device is formed of a heater as a heating element made by platinum patterning, and two temperature measuring elements as resistance elements formed of platinum thin films on an upstream side and a downstream side of the heater at equal intervals, and lead patterns of these elements.

5. The flow sensor according to claim 2, wherein the through electrode is formed of a electrode column and an insulating member that insulates a circumference of the electrode column pierces the substrate from the front surface to the rear surface while maintaining an air-tight state, and a facet of the through electrode is level with the front surface and the rear surface of the substrate.

6. The flow sensor according to claim 2, wherein the flow path body has a concave portion that accommodates the flow sensor chip and is formed on an upper surface, and a concave groove that has a rim portion internally coming into contact with a side wall is formed on a bottom surface of this concave portion, and the seal unit is a O ring, and the concave groove is used to attach the O ring, and a height of an inner rim portion thereof is set smaller than a thickness of the O ring and a width thereof is formed slightly larger than the thickness of the O ring.

7. The flow sensor according to claim 2, wherein a hole as an external signal fetching region is formed at the center of the pressing plate, and the hole has a size allowing an inner peripheral surface to be positioned outside the through electrodes formed on both sides of the flow rate detecting device of the flow sensor chip.

* * * * *